United States Patent [19]

van der Lely

[11] 4,174,002

[45] Nov. 13, 1979

[54] SOIL CULTIVATING MACHINES

[76] Inventor: Cornelis van der Lely, 7, Brüschenrain, Zug, Switzerland

[21] Appl. No.: 810,621

[22] Filed: Jun. 27, 1977

Related U.S. Application Data

[63] Continuation of Ser. No. 625,083, Oct. 23, 1975, abandoned.

[30] Foreign Application Priority Data

Oct. 24, 1974 [NL] Netherlands .................. 7413903

[51] Int. Cl.² .................. A01B 33/06; A01B 33/10
[52] U.S. Cl. .................................. 172/49; 172/59; 172/719; 172/720; 172/762
[58] Field of Search .................. 172/49, 59, 111, 700, 172/713, 719, 720, 762

[56] References Cited

U.S. PATENT DOCUMENTS

| 447,936 | 3/1891 | Brinkerhoff | 172/719 X |
|---------|--------|-------------|-----------|
| 484,758 | 10/1892 | Sears | 172/719 |
| 623,645 | 4/1899 | Young | 172/713 |
| 2,110,790 | 3/1938 | Daugherty et al. | 172/59 |
| 2,117,461 | 5/1938 | Stemman | 172/720 |
| 3,809,166 | 5/1974 | Lely et al. | 172/59 X |
| 3,821,989 | 7/1974 | Lely et al. | 172/59 |

FOREIGN PATENT DOCUMENTS

| 9601 of 1928 | Australia | 172/719 |
| 106027 12/1938 | Australia | 172/762 |
| 711913 6/1965 | Canada | 172/762 |
| 472016 2/1929 | Fed. Rep. of Germany | 172/762 |
| 967149 3/1950 | France | 172/111 |

Primary Examiner—Paul E. Shapiro
Attorney, Agent, or Firm—William B. Mason; Penrose Lucas Albright

[57] ABSTRACT

A cultivating machine has soil working members that are driven to rotate about corresponding upwardly extending shafts. Each member includes a generally horizontal support and a tine or tine-shaped portion at each outer end thereof. The lower straight part of each tine has a chisel that is detachably secured thereto so that a leading edge of the chisel, considering the direction of rotation of the soil working member, is positioned to cut the ground. The chisel can be in the form of a knife or blade or a polygonal member with more than one side being a cutting edge. Also, the chisel can be mounted to extend at an angle to enter the ground. A fastening portion of the chisel can be sleeve-shaped and fitted on the lower active tine part.

3 Claims, 23 Drawing Figures

SOIL CULTIVATING MACHINES

This application is a continuation of Ser. No. 625,083 filed Oct. 23, 1975, now abandoned.

According to one aspect of the invention, there is provided a soil cultivating machine of the kind set forth, wherein a lower region of an upwardly extending and substantially straight portion of each soil working member has a chisel detachably fastened to it.

For a better understanding of the invention, and to show how the same may be carried into effect, reference will now be made, by way of example, to the accompanying drawings, in which.

Figure 1:
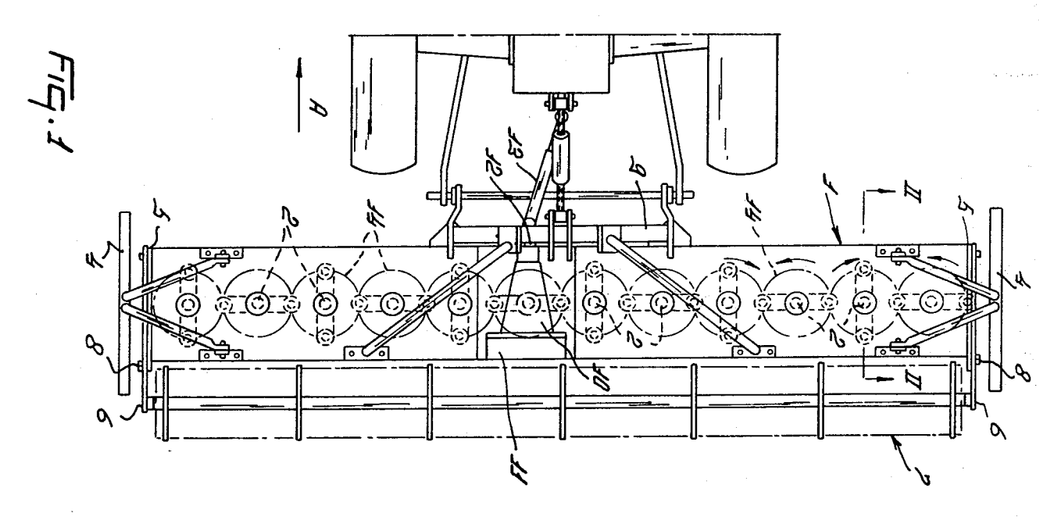
FIG. 1 is a plan view of a soil cultivating machine in the form of a rotary harrow in accordance with the invention, the harrow being connected to the rear of an agricultural tractor.

Referring to FIGS. 1 to 4 of the drawings, the soil cultivating machine that is illustrated is in the form of a rotary harrow which has a hollow box-shaped frame portion 1 that extends substantially horizontally transverse, and normally substantially horizontally perpendicular, to the intended direction of operative travel of the harrow which is indicated in FIG. 1 of the drawings by an arrow A. A plurality of upwardly extending and normally vertical or substantially vertical shafts 2 are rotatably journalled in the hollow frame portion 1 and are arranged in a single row at regularly spaced apart intervals which may advantageously, but not essentially, have magnitudes of substantially 25 centimeters. In the embodiment which is illustrated somewhat diagrammatically in FIG. 1 of the drawings, there are twelve of the shafts 2 but it will be understood that there may be greater or lesser numbers of those shafts. The lowermost end of each shaft 2 projects from beneath the bottom of the frame portion 1, the downwardly projecting portion thereof having a corresponding soil working member 3 firmly but releasably secured to it. Substantially vertically disposed shield plates 4 are disposed immediately beyond the opposite ends of the single row of soil working members 3 so as to extend substantially parallel to the direction A. A lower edge region of each shield plate 4 is arranged to be slidable over the ground surface in the direction A and each shield plate 4 is secured to a corresponding pair of arms that are pivotably connected to brackets mounted on top of the frame portion 1, the pivotal connections defining substantially horizontal axes that are substantially parallel to the direction A. This arrangement enables the shield plates 4 to turn upwardly and downwardly to some extent to match undulations in surface of the ground over which the rotary harrow travels during its use, said shield paltes 4 serving to minimise ridging of the soil at the edges of the broad strip of land that is worked by the overlapping members 3 and to prevent stones and the like from being flung laterally of the path of travel of the harrow by the rapidly rotating soil working members 3.

The opposite ends of the hollow box-shaped frame portion 1 are closed by corresponding substantially vertically disposed sector-shaped end plates 5 and arms 6 are turnable upwardly and downwardly alongside those end plates 5 about strong pivots that are located at the tops and fronts of the end plates 5 with respect to the direction A to define a substantially horizontal axis that is transverse, and normally substantially perpendicular, to the direction A. Lowermost and rearmost ends of the arms 6 have a rotatable supporting and crumbling member, in the form of an open ground roller 7, mounted between them so as to be rotatable about an axis that is substantially parallel to the row of soil working members 3 and to the axis about which the arms 6 are upwardly and downwardly turnable relative to the frame portion end plates 5. The ground roller 7 comprises a central axially extending support that is preferably of tubular construction and a plurality of elongate elements that are arranged at the periphery of the roller at substantially regularly spaced apart intervals around its axis of rotation. The elongate elements are not illustrated in the drawings but extend either parallel to the axis of rotation of the roller 7 or helically around that axis. Rearmost edge regions of the sector-shaped end plates 5 of the frame portion 1 are formed with slots or rows of holes and bolts 8 or equivalent fastening members are entered through single holes in the arms 6 and through said slots or chosen ones of the alternative holes. It will be evident that the bolts 8 can be employed to retain the arms 6, and thus the roller 7, in a chosen angular setting about the pivotal connection of those arms to the frame portion 1 and that the setting which is chosen is a principal factor in determining the depth of penetration of the soil working members 3 into the ground.

A central region of the front of the frame portion 1 with respect to the direction A is provided with a generally triangular coupling member or trestle 9 that is constructed and arranged for connection to a three-point lifting device or hitch at the rear of an agricultural tractor or other operating vehicle in the generally known manner which is illustrated in outline in FIG. 1 of the drawings. One of the center pair of shafts 2 of the single row thereof has an upward extension through the top of the frame portion 1 into a gear box 10 that is mounted on top of the frame portion. The gear box 10 contains an upper shaft 12 that extends substantially horizontally parallel to the direction A and a lower parallel shaft that is not visible in the drawings. The lower shaft 2 is in driving connection with the extension of one of the shafts 2 that has been referred to above, by way of meshing bevel pinions, and rear ends of both the lower shaft and the upper shaft 12 project through a rear wall of the gear box 10 and into a change-speed gear 11 that is secured to the back of that gear box. The ends of the two shafts that project into the change-speed gear 11 are splined and are arranged to receive chosen pairs of interchangeable and/or exchangeable straight-toothed or spun-toothed pinions. The particular pair of pinions that is chosen, and its arrangement on the two shafts, dictates the transmission ratio between the lower shaft and the upper shaft 12 in the gear box 10 and thus enables the soil working members 3 to be rotated at different speeds without having to alter the input speed of rotation that is applied to the upper shaft 12. The leading end of the upper shaft 12 projects forwardly from the front of the gear box 10 and is there splined or otherwise keyed to enable it to be placed in driven connection with the power take-off shaft of an agricultural tractor or other operating vehicle through the intermediary of a telescopic transmission shaft 13, which is of a construction that is known per se, having universal joints at its opposite ends. Each of the shafts 2 is provided, inside the hollow frame portion 1, with a corresponding straight-toothed or spur-toothed pinion 14, the teeth of each pinion 14 being in mesh with those of its neighbour, or both of its neighbours, in the single row thereof so that, during operation, each pinion 14, together with the corresponding shaft 2 and soil working member 3, will rotate in the opposite direction to that of its neighbour or both of its neighbours (see the small arrows in FIG. 1 of the drawings).

Figures 2, 3, 4:
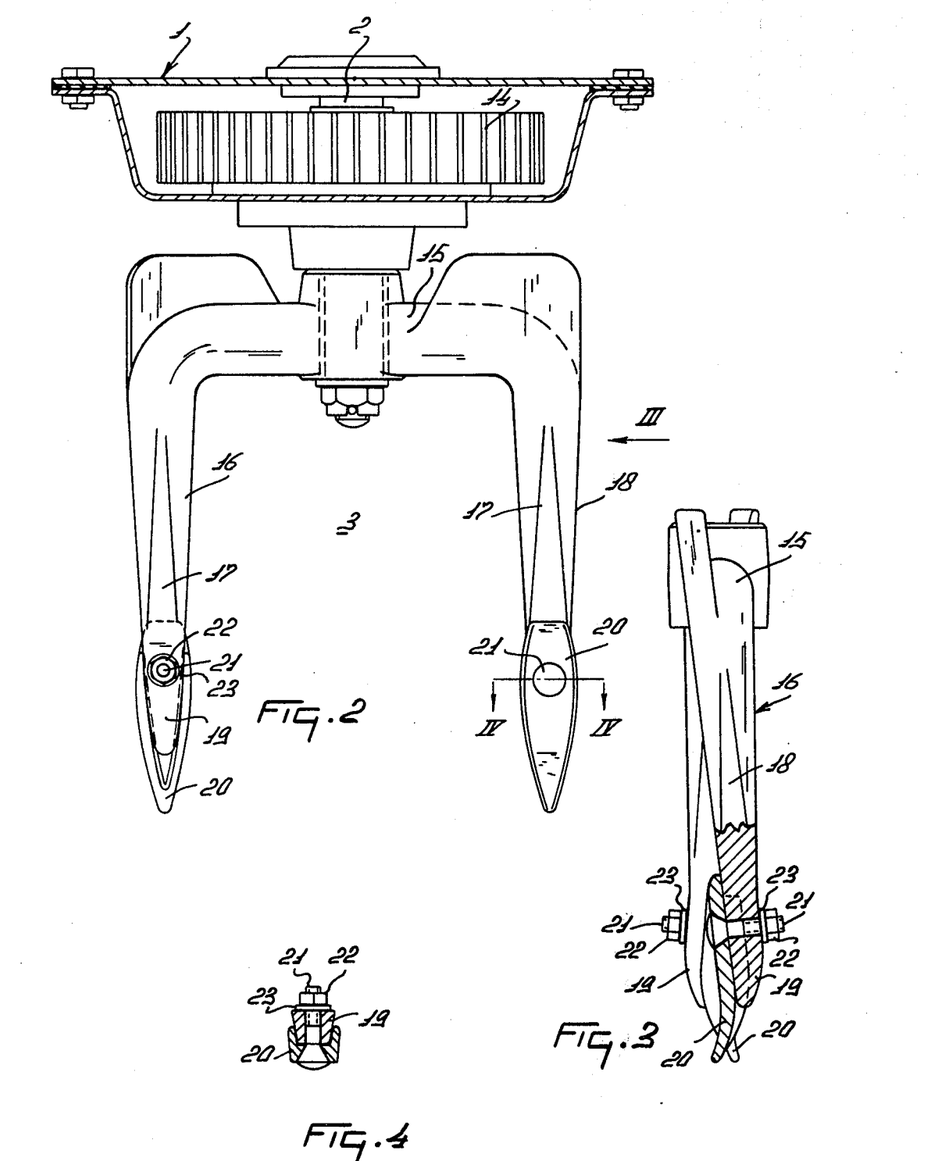
FIG. 2 is a section, to an enlarged scale, taken on the line II—II in FIG. 1.
FIG. 3 is a part-sectional elevation as seen in the direction indicated by an arrow III in FIG. 2.
FIG. 4 is a section taken on the line IV—IV in FIG. 2.

Each soil working member 3 comprises an upper substantially horizontal support 15 whose center has a hub that is firmly but releasably secured to a lower end region of the corresponding shaft 2 in a manner that it is not necessary to describe in detail for the purposes of the present invention but that will be generally apparent from a study of FIG. 2 of the drawings. The diametrically opposed ends of the support 15 merge into downwardly directed generally tine-shaped portions 16 that both extend substantially, although not truly, parallel to the axis of rotation of the corresponding shaft 2. Each support 15 and the corresponding portions 16 are formed integrally by forging or casting. An upper operative part of each portion 16 is substantially straight throughout its length but is inclined rearwardly (with respect to the intended direction of operative rotation of the corresponding shaft 2) from top to bottom, away from a plane which contains the longitudinal axis of said shaft 2 and the corresponding support 15, by an angle which has a magnitude that is preferably substantially 8°. The upper operative parts of the portions 16 thus trail rearwardly to some extent with respect to the intended directions of operative rotation of the soil working members 3 (see particularly FIG. 3 of the drawings). Each portion 16 tapers downwardly towards its lowermost end, commencing with a substantially circular cross-section at its upper integral junction with the corresponding support 15 but soon changing to a progressively more polygonal cross-section because of the provision of opposed front and rear flats 17 and opposed inner and outer flats 18. The terms "front" and "rear" refer, in this connection, to the intended directions of rotation of the corresponding soil working members 3 and the terms "inne" and "outer" relate to the dispositions of the flats 18 concerned in radial directions from the axis of rotation of the soil working members 3. It will be evident from FIGS. 2 and 3 of the drawings that the flats 17 and 18 become progressively greater in width towards the lower ends of the upper operative parts of the portions 16. Each portion 16 has a lower end 19 which, as will be evident from FIG. 3, is bent over rearwardly to a very slight extent from the overlying operative part of the same portion 16 with respect to the intended direction of operative rotation of the soil working member 3 concerned. A chisel 20 is provided at the front of each lower end 19, with respect to the direction that has just been mentioned, and bears against the corresponding front flat 17. Each chisel 20 includes a fastening portion whose length is substantially parallel to that of the co-operating lower end 19, said fastening portion being of U-shaped or channel-shaped cross-section (FIG. 4), the limbs of the U or channel diverging rearwardly to a small extent from the leading base or web thereof. As will be evident from FIG. 4, in particular, of the drawings, the fastening portion of each chisel 20 embraces the front of the corresponding gently downwardly tapering lower end 19. Each chisel has a substantially flat front and extends downwardly to a lowermost tip which tip is included in an operative portion of the chisel that is curved forwardly to some extent (see FIG. 3) with respect to the intended direction of operative rotation of the corresponding soil working member 3. Each chisel 20 is firmly but releasably secured to the lower end 19 of the corresponding tine-shaped portion 16 by a bolt 21 which has a domed head that is frusto-conically countersunk into a hole in the fastening portion of the chisel 20 concerned. The shank of each bolt 21 also extends through an aligned hole in the co-operating lower end 19 and its rearmost screwthreaded end carries a nut 22 and a clamping washer 23, said washer 23 bearing against a downward extension of the corresponding rear flat 17.

It will be seen from FIG. 2 of the drawings that, in front elevation, each chisel 20 has substantially the shape of the head of a spear or lance, the upper end thereof having a slightly smaller width than does a registering region of the corresponding front flat 17. The rearwardly divergent limbs of the fastening portion of each chisel 20 that embrace the corresponding lower end 19 extend rearwardly from the front of that lower end throughout substantially half the front to rear thickness of the end 19. The operative portion of each chisel 20 projects downwardly beyond the lowermost free end of the corresponding portion 16 by a distance which is equal to substantially one-third of the upright length of the chisel.

Figures 5, 6, 7, 8, 9, 10, 11:
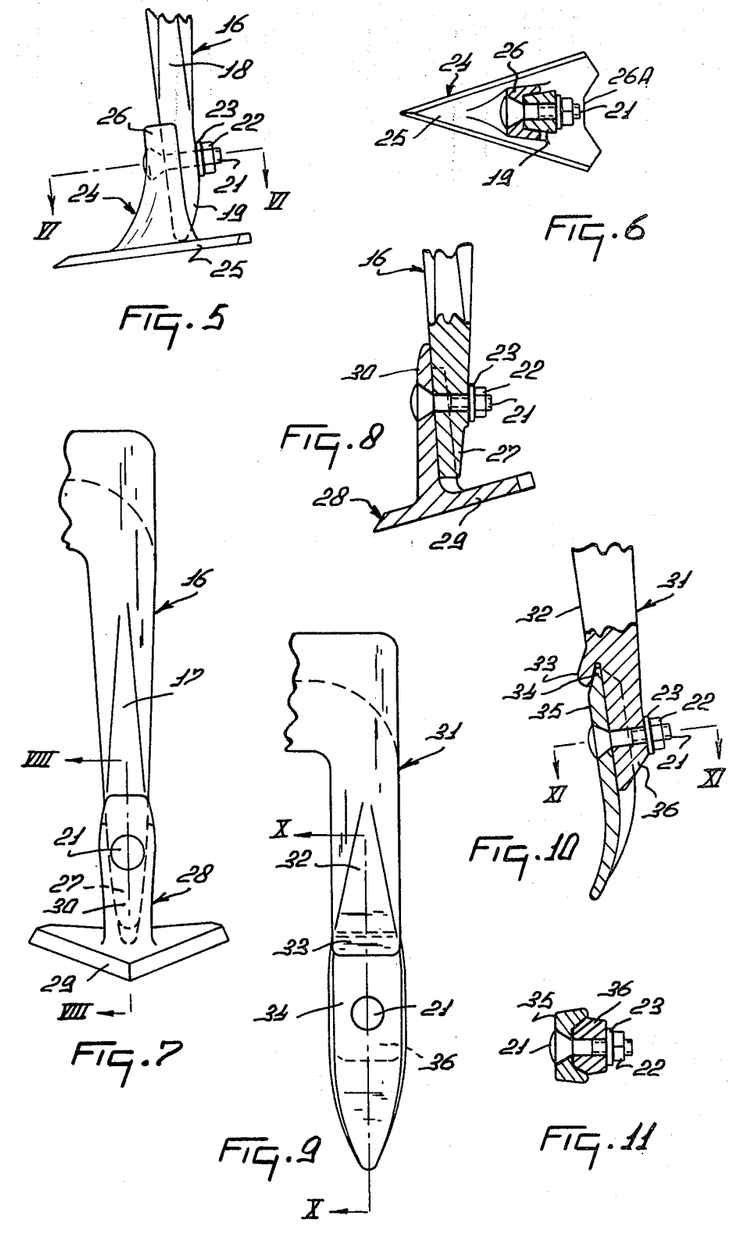
FIG. 5 is a side elevation illustrating an alternative embodiment in accordance with the invention.
FIG. 6 is a section taken on the line VI—VI in FIG. 5.
FIG. 7 is a front elevation of part of an alternative soil working member construction in accordance with the invention.
FIG. 8 is a section taken on the line VIII—VIII in FIG. 7.
FIG. 9 is similar to FIG. 7 but illustrates a further alternative construction.
FIG. 10 is a section taken on the line X—X in FIG. 9.
FIG. 11 is a section taken on the line XI—XI in FIG. 10.

FIGS. 5 and 6 of the drawings illustrate the provision of an alternative chisel 24 which has a substantially planar operative portion 25 whose general plane is perpendicular, or substantially perpendicular, to the longitudinal axis of the tine-shaped portion 16 to which the chisel 24 concerned is releasably secured. As seen in plan view (FIG. 6), the operative portion 25 of each chisel 24 is of basically isosceles triangular configuration, an apex angle of substantially 30° being enclosed between the equal sides of the triangle at the front of the chisel 24. The two sides of the triangle and are of equal length are formed as cutting edges but it will be seen from FIG. 6 of the drawings that the rear side or "base" edge of the triangle is not straight but is formed with a recess 26A. The recess 26A is formed in a central region of the rear side or "base" edge of the triangle and a substantially central region of the upper surface of the triangle is formed integrally with an upright fastening portion 26. The fastening portion 26 is tapered downwardly towards its junction with the upper surface of the operative portion 25 (see FIG. 6) and its leading surface is curved downwardly and forwardly towards that junction as illustrated in FIG. 5 of the drawings. It will also be evident from the drawings that at least an upper region of the fastening portion 26 is of substantially the same cross-section as the previously described fastening portion of the chisel 20, said fastening portion 26 co-operating with the lower end 19 of one of the tine-shaped portions 16 in the same manner as has already been described above. Parts that are similar or identical to parts that have been described in detail with reference to FIGS. 1 to 4 of the drawings are indicated in FIGS. 5 to 11 thereof by the same reference numbers and will not be described again in detail.

FIGS. 7 and 8 of the drawings illustrate an alternative construction in which each tine-shaped portion 16 has a lower end 27 that is a little different in shape to the previously described lower end 19. Each lower end 27 has a corresponding chisel 28 firmly but releasably secured to it in the manner that has been described above, said chisel 28 having an operative portion 29 whose general plane is non-perpendicularly inclined to the longitudinal axis of the corresponding tine-shaped portion 16 in such a way that the front of said portion 29 with respect to the intended direction of operative rotation of the corresponding soil working member 3 is at a lower horizontal level than is the rear thereof. As seen in plan view, the operative portion 29 is of generally isosceles triangular configuration, the two equal sides of the triangle being formed as cutting edges and converging forwardly in the intended direction of operative rotation that has just been mentioned to meet at a point. The two equal sides or edges of the triangle are inclined to one another by an angle of not less than substantially 120°. The rear edge or "base" side of each operative portion 29 is inwardly recessed in the same general manner as can be seen in FIG. 6 of the drawings in respect of the preceding embodiment although it will be realised that, in this case, the rear edge is of greater length because of the greater inclination of the two equal sides or edges to one another. As in the preceding embodiment, an upright fastening portion 30 is integral with the operative portion 29 and projects upwardly therefrom in a substantially central region of the upper surface of the operative portion 29. The fastening portion 30 has substantially the same cross-section as the previously described fastening portion 26 and the fastening portion of each chisel 20 and is secured to one of the matchingly shaped lower ends 27 by the previously described bolt 21, nut 22 and washer 23.

FIGS. 9, 10 and 11 of the drawings illustrate an alternative embodiment in which tine-shaped portions 31 are integral with the supports that form parts of the corresponding soil working members 3 and extend downwardly from those supports towards the ground surface to penetrate into that surface during operation. In this embodiment, each portion 31 commences, at its integral junction with the corresponding support, by being of substantially circular cross-section but, at a lower level, is formed with front and rear flats 32 that progressively increase in width in a downward direction (see particularly FIG. 9). However, at a distance above its lowermost free end, each portion 31 is formed with a forwardly directed bulge 33 which extends throughout the width of the corresponding front flat 32. As can be seen best in FIG. 10 of the drawings, the bulge 33 effectively forms a lip beneath which the upwardly bevelled upper end 34 of a corresponding chisel 35 is retainingly engaged. The upper end 34 of the chisel 35 forms part of the fastening portion of that chisel and it will be evident from FIG. 11, in particular, of the drawings that the previously described bolt 21, nut 22 and clamping washer 23 co-operate with said chisel fastening portion and with the lower end 36 of the corresponding tine-shaped portion 31 in clamping the chisel 35 firmly but releasably to said lower end 36. A comparison between FIGS. 4 and 11 of the drawings will show that, although the specific shapes of some of the parts are different, the form of co-operation is basically identical.

Figures 12, 13, 14, 15, 16, 17:
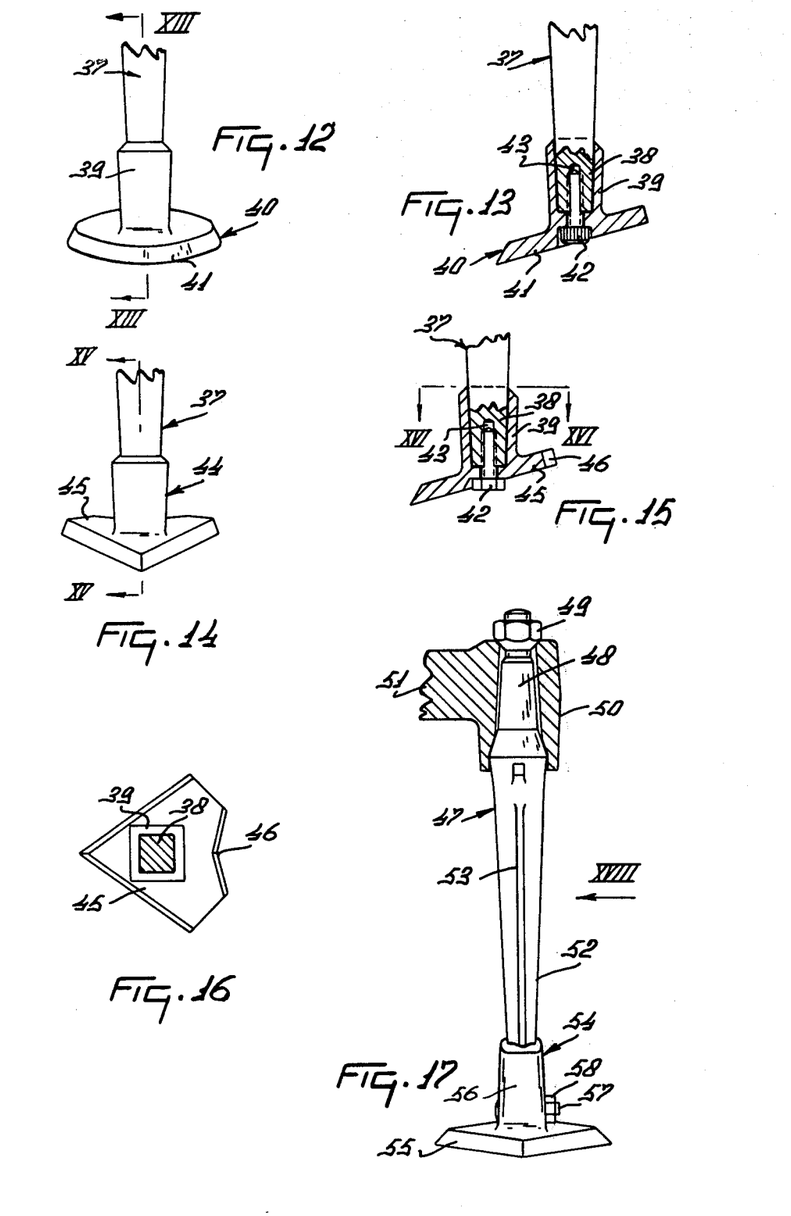
FIG. 12 is a front elevation of part of a further alternative soil working member construction in accordance with the invention.
FIG. 13 is a section taken on the line XIII—XIII in FIG. 12.
FIG. 14 is similar to FIG. 12 but illustrates a further alternative construction.
FIG. 15 is a section taken on the line XV—XV in FIG. 14.
FIG. 16 is a section taken on the line XVI—XVI in FIG. 15.
FIG. 17 is a part-sectional front elevation of one side of a further alternative soil working member construction in accordance with the invention.

FIGS. 12 and 13 of the drawings illustrate an embodiment in which tine-shaped portions 37 that are of circular or substantially circular cross-section project downwardly from supports of corresponding soil working members with which supports they are preferably, but not essentially, integral. Each portion 37 has a lower end 38 that is of a polygonal cross-section, it actually being preferred to employ a substantially square cross-section as illustrated in FIG. 16 of the drawings. Each portion 37 tapers downwardly from top to bottom including the corresponding lower end 38, that end being surrounded by a fastening portion in the form of a matchingly downwardly tapered sleeve 39. Each fastening portion or sleeve 39 is part of a corresponding chisel 40 which chisel also includes an operative portion 41. The sleeve 39 extends upwardly from a substantially central region of the upper surface of the operative portion 41 which latter is non-perpendicularly inclined to the longitudinal axis of the corresponding tine-shaped portion 37 in such a way that its front, with respect to the intended direction of operative rotation of the corresponding soil working member, is located at a lower horizontal level than is its rear. As seen in plan, each operative portion 41 is either wholly circular or at least has a leading edge region whose shape is that of an arc of a circle. Whichever shape is adopted, a leading curved edge region that subtends an angle of not less than substantially 180° at the center of the operative portion is formed as a cutting edge. The lower end of the sleeve 39 is connected by a bore with an open recess in the lower surface of the operative portion 41 and it will be seen from FIG. 13 of the drawings that the lower end 38 of the tine-shaped portion 37 is formed with an axially extending screw-threaded bore 43 that opens at the free extremity of said end 38. The shank of a correspondingly screw-threaded bolt 42 is entered upwardly through the recess in the lower surface of the operative portion 41 and into the bore 43 and, when it is tightened as illustrated in FIG. 13 of the drawings, it maintains the chisel 40 in firm but releasable clamped engagement with the corresponding tine-shaped portion 37.

FIGS. 14, 15 and 16 of the drawings illustrate an alternative embodiment which is similar in some respects to the embodiment that has just been described with reference to FIGS. 12 and 13 of the drawings. However, in the embodiment of FIGS. 14 to 16 of the drawings, chisels 44 are employed that have operative portions 45 which are not of circular or substantially circular configuration. The inclination of the general plane of the illustrated operative portion 45 to the longitudinal axis of the corresponding tine-shaped soil working member portion 37 is the same as in the case of the embodiment of FIGS. 12 and 13 of the drawings, the foremost extremity of the portion 45 with respect to the intended direction of operative rotation of the corresponding soil working member being at the lowest horizontal level. As seen in plan view (FIG. 6), each operative portion 45 is of basically isosceles triangular configuration, the two equal sides of the triangle being in forwardly convergent relationship with respect to the intended direction of operative rotation that has just been mentioned with said sides meeting in front of the sleeve 39. The two equal sides are formed as cutting edges which are inclined to one another at an angle of substantially 60°. The rear side or edge of the triangle is not straight but exhibits two rearwardly divergent edges whose rearmost ends are interconneced by a shallow V-shaped recess 46 whose point is directed forwardly with respect to the intended direction of operative rotation.

Figure 18:
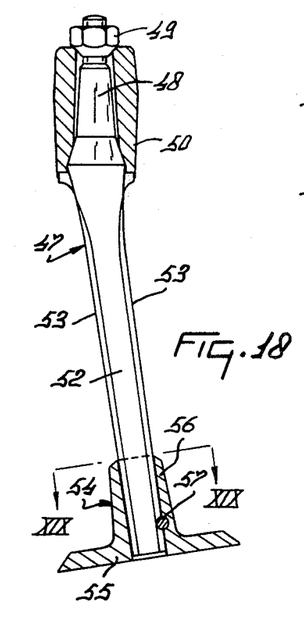
FIG. 18 is a part-sectional side elevation as seen in the direction indicated by an arrow XVIII in FIG. 17.
Figure 19:
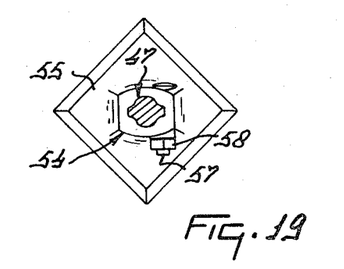
FIG. 19 is a section taken on the line XIX—XIX in FIG. 18.

FIGS. 17, 18 and 19 of the drawings illustrate a further alternative construction in which each soil working member 3 includes a horizontal or substantially horizontal support 51 that has substantially vertically disposed and substantially cylindrical tine holders 50 arranged at its opposite ends, preferably in an integral manner as illustrated in FIG. 17. The interior of each tine holder 50 receives a fastening portion 48 of a corresponding rigid tine 47 which is, of course, a tine-shaped portion of the corresponding soil working member. An active or soil working portion 52 of the illustrated tine 47 extends downwardly towards the ground surface from the support 51 and will penetrate into that surface during operation. The two portions 48 and 52 are both substantially straight and their longitudinal axes are inclined to one another at a angle of substantially 8° (see FIG. 18) in such a way that the active or soil working portion 52 will trail rearwardly from the fastening portion 48 with respect to the intended direction of operative rotation of the corresponding soil working member. The fastening portion 48 includes a screw-threaded stub shaft at its uppermost end which co-operates with a fastening nut 49. The configuration of the interior of the tine holder 50, the fastening portion 48 of the tine 47 and the fastening nut 49 are such that, when the nut 49 is tightened, the tine 47 is clamped firmly but releasably in the holder 50 in such a way that the fastening portion 48 cannot turn to any significant extent about its own longitudinal axis in the holder 50.

The straight active or soil working portion 52 of the tine 47 tapers downwardly towards its lowermost free end or tip and, except at its extreme uppermost end, it has a cross-section which is best described as polygonal although that word is not entirely accurate. The cross-section of the portion 52 progressively changes from the upper to the lower end thereof, there being, in particular, a flattening of the tine portion 52 which has the result that, at or near the lowermost free end or tip of the portion 52, the ratio between the two diagonals of the basically rectangular cross-section is substantially 1:2. The cross-sectional diameter of greater magnitude extends tangentially, or substantially tangentially, with respect to a circle centered upon the axis of rotation of the corresponding soil working member 3. The what would otherwise be flat sides of the basically rectangular cross-section tine portion 52 are formed with grooves that extend upwardly from the lowermost end of said portion to near the junction thereof with the fastening portion 48. The grooves are quite shallow as can be seen in FIG. 19 of the drawings. The leading and rear edges of the portion 52 with respect to the intended direction of operative rotation of the corresponding soil working member 3 are flattened to form ribs 53 whereas the remaining two "inner" and "outer" edges are rounded off.

A chisel 54 is firmly but releasably secured to the lowermost end of each active or soil working time portion 52, said chisel 54 having an operative portion 55 that is of rectangular configuration as seen in substantially plan view (FIG. 19). It is preferred that, as illustrated, the operative portion 55 of each chisel 54 should be of square shape. The general plane of the illustrated operative portion 55 is substantially perpendicular to the longitudinal axis of the active or soil working portion 52 of the corresponding tine 47 but, due to the previously discussed trailing disposition of that portion 52, said chisel portion 55 is so disposed that its front with respect to the intended direction of operative rotation of the corresponding soil working member 3 is at a lower horizontal level than is its rear (see FIGS. 17 and 18). All four edges of the operative portion 55 of the chisel 54 are formed as cutting edges and a diagonal between two of those edges is substantially radial with respect to the axis of rotation of the corresponding soil working member which the other diagonal is substantially tangential to a circle centered upon that axis of rotation. A central region of the top of each operative portion 55 is integrally connected to a corresponding fastening portion in the form of a sleeve 56. The cross-sectional shape of the sleeve 56 matches that of the lower region of the tine portion 52 which it surrounds and fastening is completed by employing a bolt 57 which is passed substantially horizontally through the fastening portion 56 of the chisel 54. As will be seen from FIG. 18 of the drawings, the shank of the bolt 57 passes through a semi-circular recess in the interior of the chisel fastening portion 56 and through a substantially symmetrically aligned semi-circular recess at the rear of the tine portion 52. When a fastening nut 58 is tightened onto the screw-threaded shank of the inserted bolt 57, the chisel 54 is clamped reliably but releasably to the tine portion 52 in such a position that the extreme lowermost end of that tine portion 52 is located just above the lowermost surface of the operative portion 55 of the chisel 54.

Figure 20:
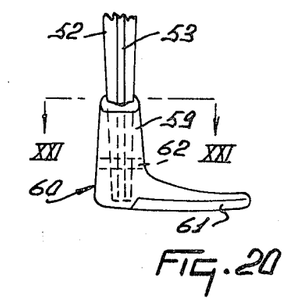
FIG. 20 is a front elevation of part of a further alternative soil working member construction in accordance with the invention.
Figure 21:
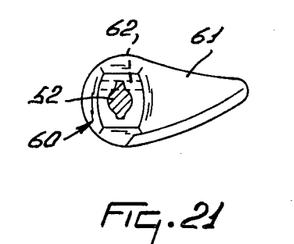
FIG. 21 is a section taken on the line XXI—XXI in FIG. 20.

FIGS. 20 and 21 of the drawings illustrate an embodiment which is similar to that of FIGS. 17 to 19 except in that the chisel 54 is replaced by a chisel 60 of knife-like formation. The chisel 60 comprises a fastening portion 59 of sleeve-like configuration whose shape matches that of the lower end of the active or soil working portion 52 of the co-operating tine 47. A resilient pin 62 is employed to maintain the fastening portion 59 in connection with the tine portion 52, said pin 62 being entered through a substantially horizontal bore in the fastening portion 59 which bore includes a substantially semi-circular region that registers with a matching substantially semi-circular groove that is formed at the rear of said tine portion 52. The chisel 60 also integrally includes an operative portion 61 that projects from the lower end of the fastening portion 59 in substantially only one direction that is substantially radial with respect to the longitudinal axis of the co-operating tine portion 52. Said direction is also substantially radially outward, from the chisel fastening portion 59, with respect to the axis of rotation of the soil working member 3 concerned. It can be seen from FIGS. 20 and 21 of the drawings that the radially outermost end of the operative portion 61 is in the form of a rounded point or tip and that the leading gently curved edge of said portion 61 with respect to the intended direction of operative rotation of the soil working member 3 concerned is formed as a cutting edge, the curvature of said edge being oriented rearwardly towards the rounded point or tip with respect to the same direction of rotation.

Figure 22:
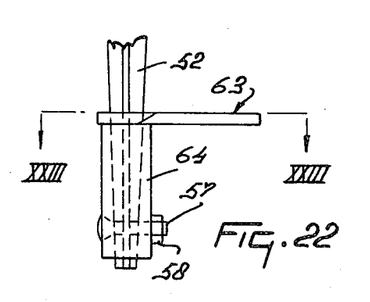
FIG. 22 is a front elevation of part of a still further soil working member construction in accordance with the invention.
Figure 23:
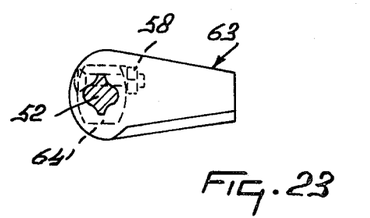
FIG. 23 is a section taken on the line XXIII—XXIII in FIG. 22.

FIGS. 22 and 23 of the drawings illustrate an alternative embodiment in which the chisels 54 and 60 of FIGS. 17 to 21 of the drawings are replaced by a knife-like chisel 63. In this case, the chisel 63 has a fastening portion 64 that is disposed above, rather than beneath, the operative portion of the chisel. It will be seen from a comparison between FIGS. 23 and 21 of the drawings that the operative portion of the chisel 63 is somewhat similar to the operative portion 61 of the chisel 60 except that, in the case of the chisel 63, both its leading and rear edges, with respect to the intended direction of operative rotation of the soil working member 3 concerned, are straight edges that are in convergent relationship in a radially outward direction. Instead of being formed as a rounded point or tip, the radially outermost end of the operative portion of the chisel 63 is a straight edge. The leading edge of the operative portion with respect to said direction of rotation is again formed as a cutting edge. The fastening portion 64 is of sleeve-like formation and is shaped to match the lower end of the active or soil working portion 52 of the tine 47 which it surrounds. The fastening portion 64 is maintained in connection with the tine portion 52 by the bolt 57 and nut 58 that have been described above. It will be noted from FIG. 22 that, in this case, the lowermost extremity of the tine portion 52 projects a short distance below the lowermost end of the chisel fastening portion 64 and that the operative portion of the chisel 63 is located at a predetermined distance above the extreme lowermost end of the tine portion 52.

In the use of the rotary harrow that is illustrated somewhat diagrammatically in FIG. 1 of the drawings, its coupling member or trestle 9 is connected to the three-point lifting device or hitch at the rear of an agricultural tractor or other operating vehicle in the generally known manner that is shown in FIG. 1. The forwardly projecting upper shaft 12 of the gear box 10 is placed in driven connection with the power take-off shaft of the same tractor or other operating vehicle by using the telescopic transmission shaft 13 that has universal joints at its opposite ends. Upon rotating the power take-off shaft of the tractor or other vehicle, the soil working members 3 will be caused to rotate in the directions that are indicated by arrows in FIG. 1 of the drawings by operation of the transmission members contained within the gear box 10, the change-speed gear 11 and the hollow frame portion 1. The speed of rotation of the soil working members 3 in response to a substantially standard speed of rotation of the power take-off shaft of the tractor or other vehicle is dictated by disposing an appropriate pair of pinions in the change-speed gear 11. The depth of penetration of the soil working members 3 into the ground is dictated by disposing the roller 7 at an appropriate level with respect to the frame portion 1 by adjustment of the arms 6 and subsequent tightening of the bolts 8. These adjustments are performed having regard to the nature and conditions of the soil that is to be worked and the soil consistency that is desired after cultivation has been effected. As the rotary harrow is moved operatively over the soil in the direction A, the tine-shaped portions or tines of the soil working members 3 penetrate into the soil with the chisels that they carry. Each soil working member 3 cultivates a corresponding strip of land whose width is a little greater than the distance between the axes of rotation of the shafts 2. Accordingly, said strips of land overlap one another to produce, in effect, a single broad strip of worked soil. The various chisels that have been described, and that are illustrated in the drawings, are particularly suitable for use on very hard soil such as is frequently found in the autumn after harvesting has taken place. The chisels effectively break loose the hardened upper layer of soil and the tine-shaped portions or tines of the soil working members, to which the chisels are secured, also penetrate into the soil, loosening and breaking up the latter.

The various chisels that have been described can all be replaced quickly and easily either by identical chisels or by chisels of other kinds. The rotary harrow can, of course, be used for purposes such as the preparation of a seed bed with the chisels detached from the time-shaped portions or tines of the soil working members 3. Such use is not within the scope of the present invention but this feature is mentioned in order to provide a complete description.

The provision of the chisels enables the soil working members of the rotary harrow to be quickly and easily adapted to substantially optimum working with different soils and differing soil conditions. In the embodiments of FIGS. 17 to 23 of the drawings, the chisels are releasably secured to the tines of the soil working members that are normally employed, without those chisels, for use in the penetration of seed beds and the like. It is not only possible in the embodiments of FIGS. 17 to 23 of the drawings to replace the chisels and to substitute alternative chisels but it is also possible quickly and easily to remove and replace the tines 47 themselves or to substitute different tines or other soil working tools. In the embodiment of FIGS. 22 and 23 of the drawings, the knife-like operative portions of the chisels 63 are effective at a level above that of the lowermost free ends of the tines 47 and this produces a very effective cultivating or harrowing action, particularly in fields that are badly infested with weeds.

Although various features of the rotary harrow embodiments that have been described and/or that are illustrated in the accompanying drawings will be set forth in the following claims as inventive features, it is emphasised that the invention is not necessarily limited to those features and that it includes within its scope each of the parts of each embodiment that has been described and/or that is illustrated in the accompanying drawings both individually and in various combinations.

What we claim is:

1. A rotary harrow comprising a plurality of soil working members arranged in a transverse row, said members being rotatable about corresponding substantially vertically axes and being mounted on substantially vertical shafts that define said axes, driving means being connected to said shafts to rotate neighboring soil working members in relative opposite directions in order to work overlapping paths of soil, at least one of said soil working members comprising a support and a plurality of downwardly extending tines, at least one of said tines having a substantially straight soil working portion extending downwardly from said support and a chisel releaseably secured by bolt means adjacent the lower end of said portion, said chisel having a knife-like operative portion extending outwardly from said soil working portion in a substantially radial direction, said chisel having a sleeve-like fastening portion that receives the lower end of the tine soil working portion and said fastening portion of the chisel being located below the operative portion of said chisel.

2. A machine as claimed in claim 1, wherein said chisel is releaseably fixed to said tine by a bolt, said bolt having a screw threaded shank that is passed through aligned openings in said soil working portion and the chisel.

3. A harrow as claimed in claim 1, wherein a supporting roller is attached to the harrow and positioned to the rear of said soil working members with respect to the normal direction of travel, means adjusting the vertical position of the roller with respect to the soil working members to vary the working depth of said tines.

* * * * *